Oct. 3, 1961

F. H. MUELLER ET AL 3,002,775

SAFETY COUPLING FOR HYDRANT VALVE STEM

Filed July 31, 1959

INVENTORS
FRANK H. MUELLER
JOHN J. SMITH

BY
Cushman, Darby + Cushman
ATTORNEYS

United States Patent Office 3,002,775
Patented Oct. 3, 1961

3,002,775
SAFETY COUPLING FOR HYDRANT VALVE STEM
Frank H. Mueller and John J. Smith, Decatur, Ill., assignors to Mueller Co., Decatur, Ill., a corporation of Illinois
Filed July 31, 1959, Ser. No. 830,878
5 Claims. (Cl. 287—117)

The present invention relates to a rod joint or coupling, and more particularly to a frangible joint or coupling for use in connecting the parts of a plural section valve stem of a fire hydrant.

Fire hydrants having barrel sections connected together by replaceable frangible coupling parts are known. Of course, when such hydrant barrels are used, the valve stem also must be provided with a replaceable frangible coupling. Such couplings are known in the art and hydrants of this type may be knocked over without escape of water, and then reassembled merely by replacement of the frangible parts.

Among frangible valve stem couplings in use at the present time is one type which includes a threaded sleeve which connects opposed valve stem sections and has a circumferential weakened portion. Relative rotation between the sleeve and the two parts of the valve stem usually is prevented by means of a set screw in the sleeve which engages one of the stem parts. This type of frangible coupling has a decided disadvantage, however. In use of such a hydrant, the set screw frequently becomes rusted in place, so that when the coupling is fractured off, the broken part of the coupling containing the set screw cannot be removed with any degree of facility from the part of the valve stem to which it is secured. As a result, that part of the valve stem sometimes must be discarded, or else returned to a repair shop where the fractured off part of the coupling can be removed from the stem part by suitable shop tools.

Accordingly, it is an object of this invention to provide an improved frangible coupling sleeve for hydrant valve stems which embodies a set screw and wherein a fractured off part of the coupling which contains the set screw may be removed with facility from the valve stem part to which it is secured even though such set screw is so rusted or frozen in place that it cannot be removed with a normal turning tool, such as a screw driver.

It is a further object of this invention to provide an improved frangible coupling for a valve stem of the aforedescribed type that may be manufactured at substantially no greater expense than existing couplings of the same type.

Figure 1:
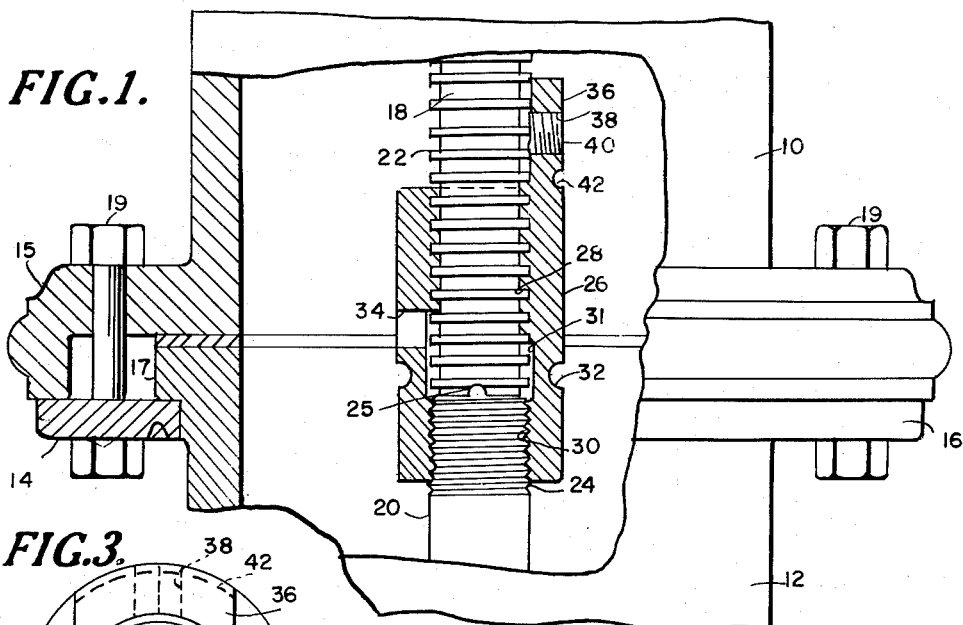
Figure 3:
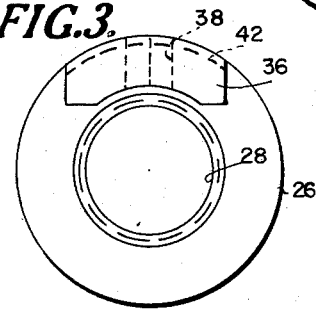
Figure 2:
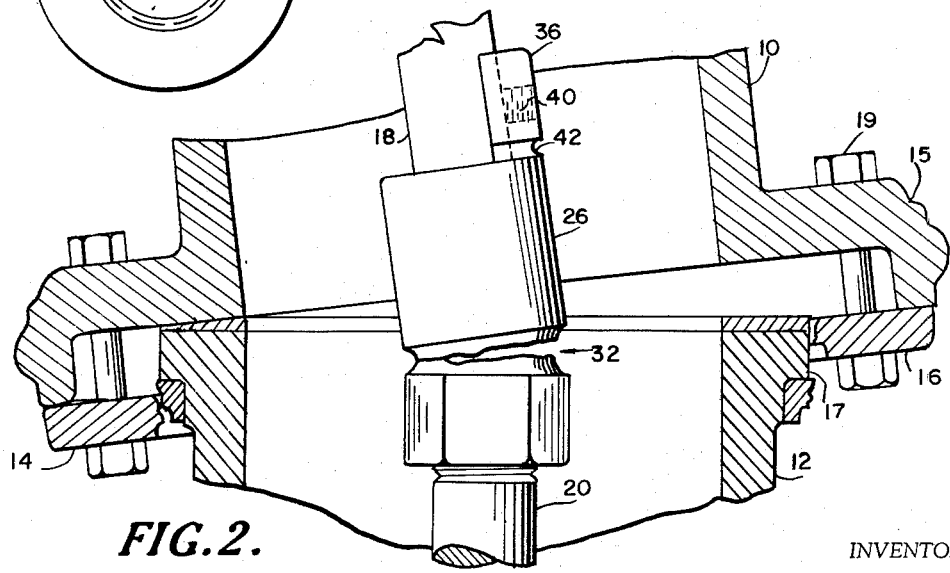

These and further objects and advantages will be readily apparent to those skilled in the art upon reading the following detailed description taken in conjunction with the appended drawings in which FIG. 1 is a fragmentary view, partly in vertical section, of a fire hydrant having a frangible barrel connection and provided with a frangible valve stem coupling embodying this invention;

FIG. 2 is a view corresponding generally to FIG. 1 but showing the hydrant parts in the positions assumed when subjected to a fracturing blow; and FIG. 3 is an end elevational view of the frangible coupling of this invention.

Referring to the drawings, the upper and lower sections or portions 10 and 12 of a fire hydrant barrel are secured in an end-to-end relation by means of a rupturable or fracturable joint which includes the usual peripheral flanges 15 and 17 fastened together by conventional semi-annular frangible members 14 and 16 and connecting bolts 19.

A valve stem extends longitudinally within the barrel portions 10 and 12 and includes upper and lower portions 18 and 20. The upper portion 18 extends upwardly for operation in the usual manner and the lower portion 20 extends downwardly to the usual hydrant valve (not shown). As shown in FIG. 1, the valve stem sections are threaded on their adjacent ends, as at 22 and 24, with the former threads 22 being of somewhat steeper pitch than the latter. The adjacent ends of the stem sections 18 and 20 are provided with a mating tongue and groove arrangement 25 which engage to prevent relative rotation between the valve stem sections when the latter have been coupled together.

The preferred embodiment of the coupling of the present invention comprises a sleeve 26, internally threaded at each end thereof, as at 28 and 30, for engagement with the threads 22 and 24, respectively, on the stem sections 18 and 20. The sleeve 26 also is provided with an interior unthreaded section 31 between the end threads 28 and 30. The sleeve 26 is further provided with an external circumferential groove, or weakened portion 32, disposed around the unthreaded section 31. The sleeve 26 is radially apertured, as at 34, substantially medially to provide for visual access to the ends of the valve stem sections 18 and 20 when being coupled together.

In order to connect the stem sections, the sleeve 26 is partially threaded onto the adjacent threaded ends of the valve stem sections. In this connection, end of the sleeve 26 is hexagonally shaped to accommodate a suitable wrench (not shown) for rotating the sleeve. Rotation of the sleeve 26, through the action of the differential threads 22 and 24, causes the valve stem sections 18 and 20 to be drawn together to engage the aforementioned tongue and groove 25. The operator, while connecting the stem sections, may look through the radial aperture 34 to insure that the tongue and groove are maintained in alignment for proper engagement.

In order to prevent relative rotation of the sleeve 26 about the coupled valve stem sections 18 and 20, the sleeve 26 is provided at its upper end with an integral lug 36 having a threaded aperture 38 to receive a set screw 40. When the two valve stem sections 18 and 20 have been properly coupled together, the set screw 40 is caused to firmly engage the upper valve stem section 18 to prevent any relative rotation between the coupling sleeve 26 and the valve stem 18.

Should a fire hydrant employing the coupling of the present invention be struck by a motor vehicle, or be subjected to any extraordinary horizontal stress or strain, the upper and lower sections of the fire hydrant will be separated in the usual manner through the rupture of the frangible members 14 and 16. The coupling sleeve 26 will also break along the weakened portion or annular groove 32 (FIG. 2), thus allowing the two valve stem sections 18 and 20 to separate without opening or causing damage to the valve.

In order to restore the hydrant to an operative condition, it is then only necessary to replace the broken sleeve 26, and the frangible members 14 and 16 in the usual manner. The lower section of the broken sleeve 26 may be readily unscrewed from the lower valve stem section 20, and the upper section of the broken sleeve may likewise be unscrewed from the upper valve stem section 18 after backing off the set screw 40. Should the set screw 40 be frozen or rusted in aperture 38, as quite frequently happens if the coupling has been in use for a substantial period of time, it would ordinarily be quite difficult to back off set screw 40 and remove the upper section of the broken sleeve 26. In the past, such freezing of a set screw has often necessitated replacement of the entire upper valve stem section 18.

However, in the device of the present invention, the lug 36 is provided with a transverse weakened portion or groove 42 in its outer surface adjacent its point of connection to the sleeve 26 to provide a frangible connection between it and the sleeve 26. Therefore, should the set screw 40 be frozen or rusted in aperture 38, through any cause, or for any reason not easily disengageable, thus preventing unthreading of the sleeve 26, it is only necessary to apply a chisel to the groove 42 or otherwise break off the lug 36; whereupon, the lug 36 and the set screw 40 will readily fall out of engagement with the upper valve stem section 18 and broken portion of the sleeve 26. After the lug 36 has thus been removed, the upper portion of the broken sleeve 26 may be readily unthreaded and the two valve stem sections recoupled with a new sleeve, in the manner previously described.

It will thus be seen that there has been provided by this invention a device in which the various objects hereinbefore set forth, togther with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

We claim:

1. A frangible coupling for a two-section valve stem having opposed threaded ends engageable against relative rotation comprising: an internally threaded sleeve having a circumferential weakened portion; means including a set screw at one end of said sleeve to engage the valve stem to prevent relative rotation between said sleeve and the valve stem; and a frangible joint between said means and said sleeve.

2. The coupling defined in claim 1 wherein said sleeve is radially apertured substantially at its mid-point to provide visual access to the valve stem sections being coupled.

3. The coupling defined in claim 1 wherein said means comprises a lug integral with the sleeve; said lug having a threaded aperture to receive a set screw engageable with the valve stem.

4. The coupling defined in claim 3 wherein said frangible joint comprises a transverse groove in the outer face of said lug adjacent the point of its connection to said sleeve.

5. A frangible coupling for a two-section valve stem having opposed threaded ends engageable against relative rotation, comprising: a sleeve having a circumferential groove disposed substantially medially in its outer surface, said sleeve being provided at its opposite ends with interior differential screw threads to engage the valve stem sections and being radially apertured substantially medially to provide visual access to the stem sections; an integral lug on one end of said sleeve having a threaded aperture therein to receive a set screw engageable with the valve stem; and a weakened portion in said lug adjacent said one end of said sleeve.

References Cited in the file of this patent

UNITED STATES PATENTS

| | | |
|---|---|---|
| 1,059,560 | Parker | Apr. 22, 1913 |
| 1,401,621 | Loudon | Dec. 27, 1921 |
| 1,411,483 | Floyd | Apr. 4, 1922 |
| 1,633,642 | Kramer | June 28, 1927 |
| 1,951,645 | Boosey | Mar. 20, 1934 |
| 2,140,245 | Mueller | Dec. 13, 1938 |
| 2,166,412 | Kiesel | July 18, 1939 |
| 2,171,078 | Cline | Aug. 29, 1939 |